United States Patent Office 2,833,359
Patented May 6, 1958

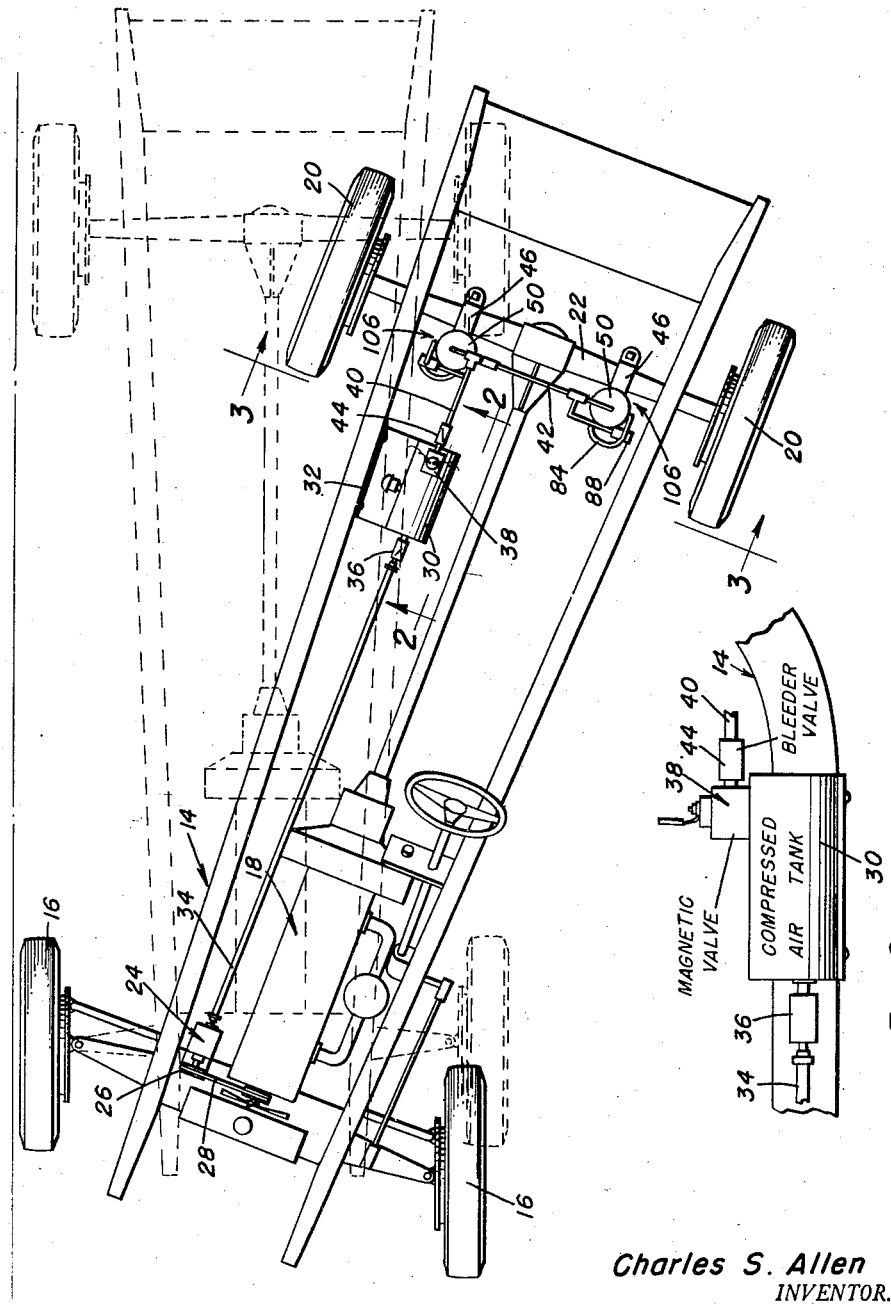

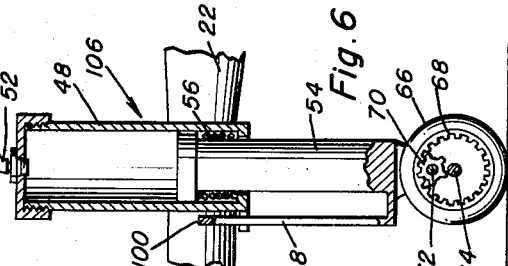
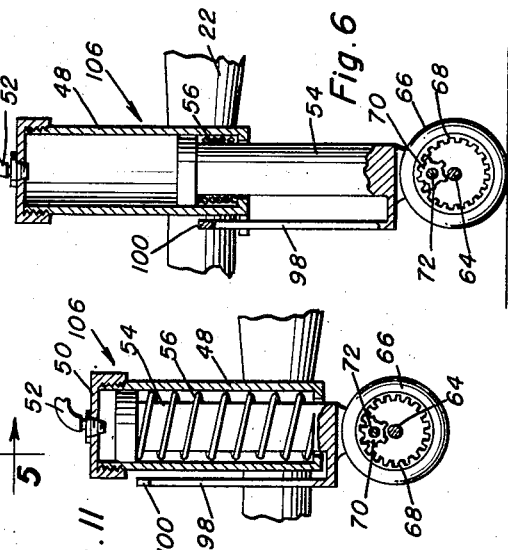
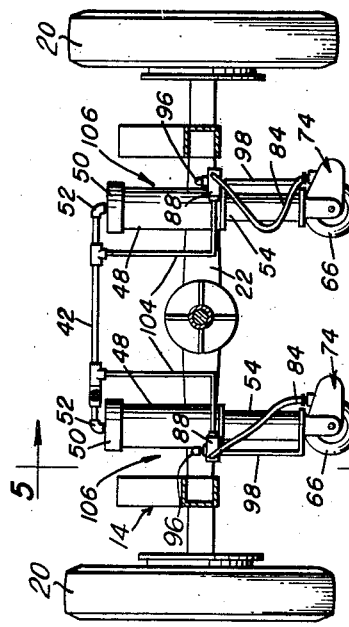
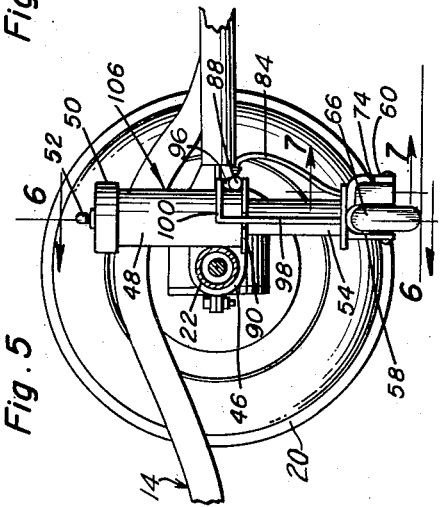
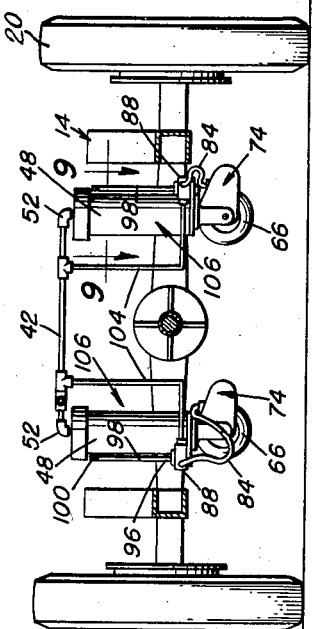
Charles S. Allen
INVENTOR.

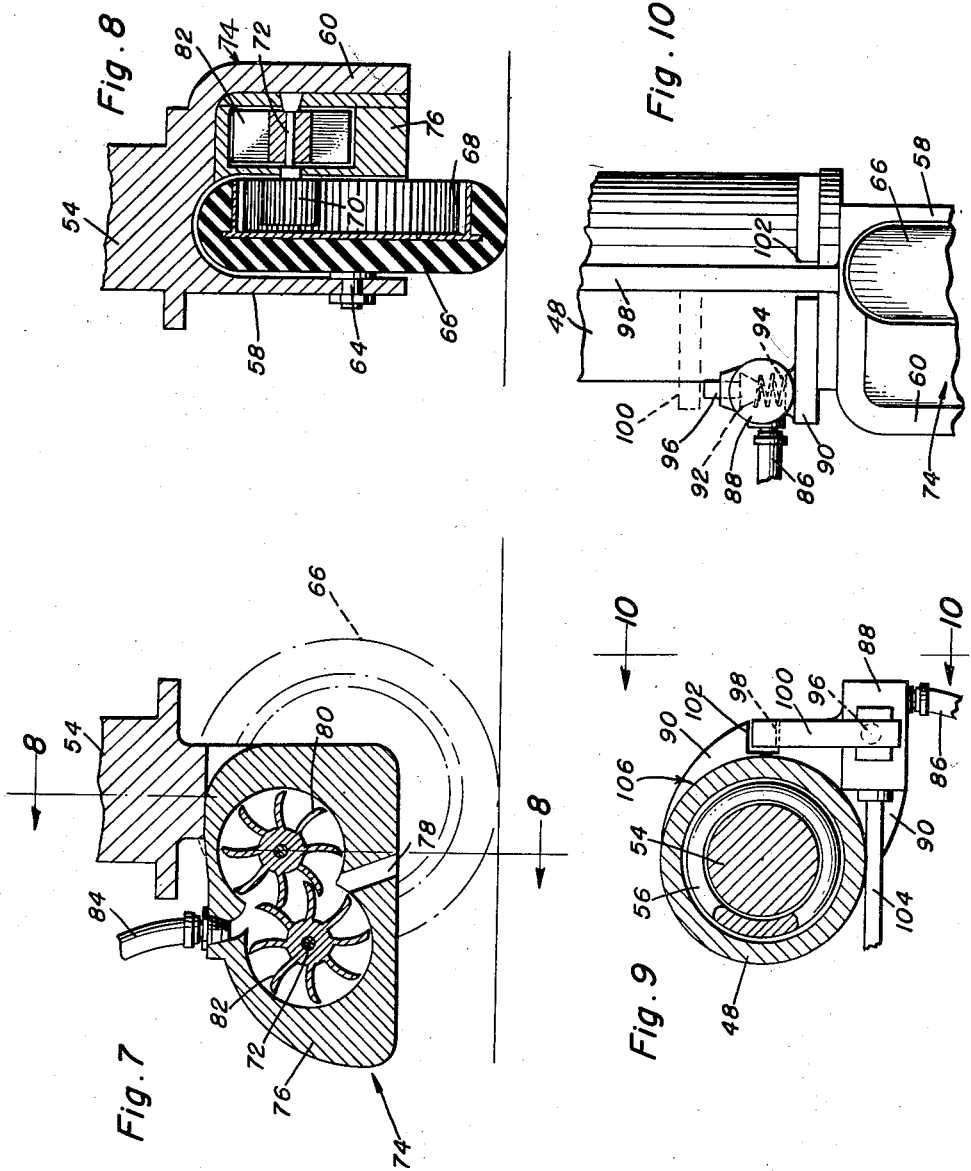

2,833,359
PARKING MEANS FOR VEHICLES
Charles S. Allen, Bakersfield, Calif.
Application December 30, 1955, Serial No. 556,542
2 Claims. (Cl. 180—1)

The present invention, as the title implies, pertains to certain new and useful improvements in parking means for vehicles, that is, means which is permanently attached to and constitutes a part of the chassis, which is normally elevated for road clearance and may be brought into play to permit the rear end of the vehicle to be power wheeled toward a curb and thus handily parked in a given restricted space.

As is generally well known, retractible and projectible power operated parking devices are not new. Therefore, it is an object of the instant invention to structurally, functionally and otherwise improve upon similarly constructed and performing prior art adaptations. By the same token, it is an objective to attain this highly desirable result through the medium of structural means which is susceptible of practical installation on vehicles without requiring extensive alterations and which takes into consideration manufacturing requirements and economies, accessibility for repair work and effectually serves the needs of users thereof.

Briefly, the invention in a general and over-all sense involves the use of a vehicle chassis embodying a frame, an engine supported thereon, front and rear wheel assemblies supporting said frame, the rear wheel assembly having the usual axle construction and said engine having operating connection therewith, a pair of extensible and retractible air jacks mounted on and carried by the rear axle, a parking wheel operatively mounted on and controlled by each jack, said parking wheels serving, when positioned on the street or equivalent surface to permit the entire rear end of the chassis to be jacked up and rolled toward a curb or the like, an air feeding manifold communicatively connected with the upper portions of said jacks, an air compressor operatively connected with said engine, a storage tank for compressed air supported on said frame, a valved conduit communicatively joining said compressor to said tank, a remote controlled air feeding valve operatively mounted on said tank, and an air delivery pipe leading from said valve to said manifold.

Other objects, features and advantages will become more readily apparent from the following description and the accompanying sheets of illustrative drawings.

In the drawings, wherein like numerals are employed to designate like parts throughout the views:

Figure 1 is a top plan view showing the forward end of the vehicle nosed into the parking place, showing the rear end about to be parked and illustrating, in phantom lines the final parked position of the vehicle;

Figure 2 is an enlarged fragmentary view of the compressed air storage tank and the magnetic or equivalent remote-controlled valve and air delivery line or pipe, the section being on the line 2—2 of Figure 1 looking in the direction of the arrows;

Figure 3 is a section on the transverse line 3—3 of Figure 1 with the parking wheels in elevated or road clearance positions;

Figure 4 is a view similar to Figure 3 but showing the parking wheels in contact with the pavement and the vehicle wheels jacked up;

Figure 5 is a view in section and elevation taken on the line 5—5 of Figure 4;

Figure 6 is a vertical section on the line 6—6 of Figure 5;

Figure 7 is an exaggerated sectional and elevational view fragmentary in type and taken on the line 7—7 of Figure 5;

Figure 8 is a section on the irregular line 8—8 of Figure 7;

Figure 9 is a section on the line 9—9 of Figure 3;

Figure 10 is a fragmentary view in elevation, the view taken on the line 10—10 of Figure 9; and, Figure 11 is a view similar to Figure 6 but showing the spring-returned piston in its normal road clearance elevated position.

Referring now to the drawings with the aid of reference numerals and lead lines and looking at Fig. 1, the vehicle chassis is denoted generally by the numeral 14. The usual wheels of the front wheel assembly are denoted at 16 and the engine or motor at 18. The rear wheels are denoted at 20 and are mounted on a conventional rear axle construction 22. The numeral 24 denotes a suitable automatic-type air compressor having a pulley-equipped shaft 26 operated by the fan belt 28. The numeral 30 denotes a suitable storage tank for the compressed air which is mounted on a bracket 32 secured to the chassis. Communication between the compressor and tank is had by way of an appropriate conduit 34, there being an appropriate check valve 36 therein which is adjacent the forward end of the tank. Mounted atop the tank is an appropriate remote-controlled magnetic or equivalent valve 38 which delivers air from the tank to a feed pipe 40 which, in turn, is communicatively connected with a two-way manifold 42. The numeral 44 designates a bleeder valve.

Taking up now the air-operated jacks, it will be seen that two such jacks are provided and they are attached to the rear axle by way of clamps or the like as shown at 46 (Fig. 5). Each jack is the same in construction and a description of one will suffice for both. To this end, each jack comprises an air cylinder 48 having a cap or the like 50 at its top to which a fitting is connected as at 52 for purposes of delivering air from the manifold into the upper end of the cylinder. Slidable in the cylinder is an appropriate headed piston or plunger 54. The numeral 56 designates a coil return spring which is housed in the cylinder and surrounds the piston and engages the cylinder at the bottom and the head of the piston at the top, said spring being of sufficient force to automatically return and maintain the piston in the elevated position seen in Fig. 11. When air under pressure enters the cylinder 48 the piston 54 is driven down and the spring 56 is compressed as shown in Fig. 6. Formed integrally on the lower end of the piston is a yoke or equivalent construction having depending spaced arms 58 and 60 as shown in Fig. 8. The arm 58 has an appropriate bearing to accommodate a journal 64 on the parking wheel 66. The wheel is constructed with a recess and mounted therein is a fixed ring gear 68.

Motion is imparted to the gear by way of a pinion 70 which is in constant mesh therewith, said gear being mounted on a driven shaft 72 of the small air motor 74. The air motor is appropriately mounted in the yoke and comprises a housing or casing 76 as shown in Fig. 7 having a vent 78 at the bottom. Mounted in the chambered portion are bladed impellers or rotors denoted generally by the numerals 80 and 82, respectively. The impeller 82 is fixed on the shaft 72 and therefore serves to operate the pinion. Pressured air is fed into the impeller chambers by way of a flexible hose 84, the hose being connected at its lower end thereto. The upper end of the hose 84 is connected as at 86 (see Fig. 10) to a valve 88 mounted on a shelf-like flange 90 affixed to the lower end portion of the cylinder 48. The valve 88 is constructed to accommodate a valve element 92 which is seated by a spring 94 in the valve casing. This is a plunger-type valve and has a button-like trip stem 96 which is exposed above the top of the casing. A substantially L-shaped trigger or trip member is provided and this comprises an L-shaped construction including a long vertical arm 98 which is integrally connected at its lower end to the yoke and a short horizontal arm 100 which is laterally directed and has its end engageable with the valve trip plunger or stem 96 as shown in full lines in Fig. 5 and dotted lines in Fig. 10. The aforementioned flange 90 has a guide notch 102 (Fig. 10) therein for the arm 98. The valve 88 receives air by way of a by-pass type or equivalent conductor which, as shown in Fig. 4, is denoted by the numeral 104 and is communicatively connected with an adjacent end of the aforementioned manifold 42. Thus, the one manifold serves to supply air first to the air jacks or cylinders 106 and then to the air motors 74 which operate the traction parking wheels 66.

It will be understood that normally the parking wheels 66 are elevated and assume the road clearance position illustrated in Fig. 3. Therefore, when it is desired to park the vehicle equipped with this invention it is necessary to drive into the parking space head-first. That is to say, the forward wheel means is nosed into the selected parking space as shown in full lines at the left in Fig. 1. Then the elevating and parking jacks 106 are brought into play. That is to say, the remote-controlled magnetic or equivalent valve 38 is operated to supply compressed air from the tank and to deliver it by way of the feeder pipe 40 to the manifold 42. The air from the manifold enters the cylinders 48 and drives the pistons 54 down against the tension of the springs 56 as shown in Fig. 6 of the drawing. As the parking wheels 66 approach and contact the ground or pavement the trip arm 100 engages the valve stem 96 and depresses and opens the valve 92. Air from the manifold by way of the by-pass 104 now brings the air motors 74 into play. The air motors obviously drive the geared parking wheels and these are maintained at approximate right angles to the curb line. The rear end of the vehicle is now rolled into place from the full line position shown at the right to the same end position shown in phantom lines and the vehicle is parked in a substantially obvious manner.

It is to be understood that the air compressor 24 may be of any suitable construction and driven in any appropriate way such as, for example, by way of the fan belt as shown in Fig. 1. Likewise, the means for supplying air from the compressor to the tank and the construction of the tank may vary. The air motors may vary in construction and a muffler may have to be provided for the vent 78 in Fig. 7. The parking wheels turn only in one direction toward the curb. The driver gets back on the street in the usual manner, that is, without the aid of the parking wheels 66. It is felt, therefore, that a more extensive detailed description is unnecessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. For use on a rear wheel supported axle of a vehicle, a fluid operated jack comprising a cylinder having means whereby it may be fixedly mounted in a vertical position on said axle, a piston mounted slidingly in said cylinder and projectible downwardly and beyond the lower end of said cylinder, means for feeding fluid under pressure into the upper portion of said cylinder and driving said piston to a "down" position, a yoke affixed to the lower end of said piston, a parking wheel mounted for rotation in and on said yoke, an air operated motor operatively carried by said yoke and cooperative with said wheel and having a motion transmitting shaft transmitting motion to said wheel, a flexible air conducting hose communicatively connected at its lower end with said air motor, a shelf-like flange fixed on the lower end portion of said cylinder and having a guide therein, a normally closed air supply valve mounted on said flange, and trip means comprising an L-shaped rod having a vertical arm connected at its lower end to said yoke and extending slidingly through said guide and above said flange, and a horizontal arm operatively engageable with said valve, the upper end of said hose being operatively connected with said valve.

2. In combination, a vehicle chassis embodying a frame, an engine supported thereon, front and rear wheel assemblies supporting said frame, the rear wheel assembly having the usual axle construction and said engine having operating connection therewith, a pair of extensible and retractible air jacks mounted on and carried by the rear axle, each jack comprising an air cylinder affixed to said rear axle, a piston operatively mounted in said cylinder, an air delivery manifold communicatively connected with the upper end portions of said cylinders, a parking wheel supported by and journaled for rotation on the lower end of said piston, an air operated motor also supported by said lower end and having a motion transmitting shaft in driving engagement with said parking wheel, a normally closed valve affixed to the lower end of said cylinder, a flexible hose operatively connecting said valve and air motor, an air line connecting said valve with said manifold, and trip means secured to said piston and adapted to open said valve at the approximate moment the parking wheel comes into traction turning contact with a pavement, said trip means comprising an L-shaped rod having a long vertical arm affixed to said piston at its lower end and a short horizontal arm on the upper end of said vertical arm and operatively cooperable with said valve in a manner to open the valve and for delivering air under pressure to said air motor.

References Cited in the file of this patent

UNITED STATES PATENTS

| | | |
|---|---|---|
| 1,220,028 | Sharp | Mar. 20, 1917 |
| 1,387,626 | Swanson | Aug. 16, 1921 |
| 1,609,044 | Williams | Nov. 30, 1926 |
| 1,639,054 | Palmer | Aug. 16, 1927 |
| 1,890,716 | Andreasen et al. | Dec. 13, 1932 |

FOREIGN PATENTS

| | | |
|---|---|---|
| 709,513 | Great Britain | May 26, 1954 |